C. R. ILIFF.
Plotting Instrument.
No. 19,091.                                    Patented Jan. 12, 1858.
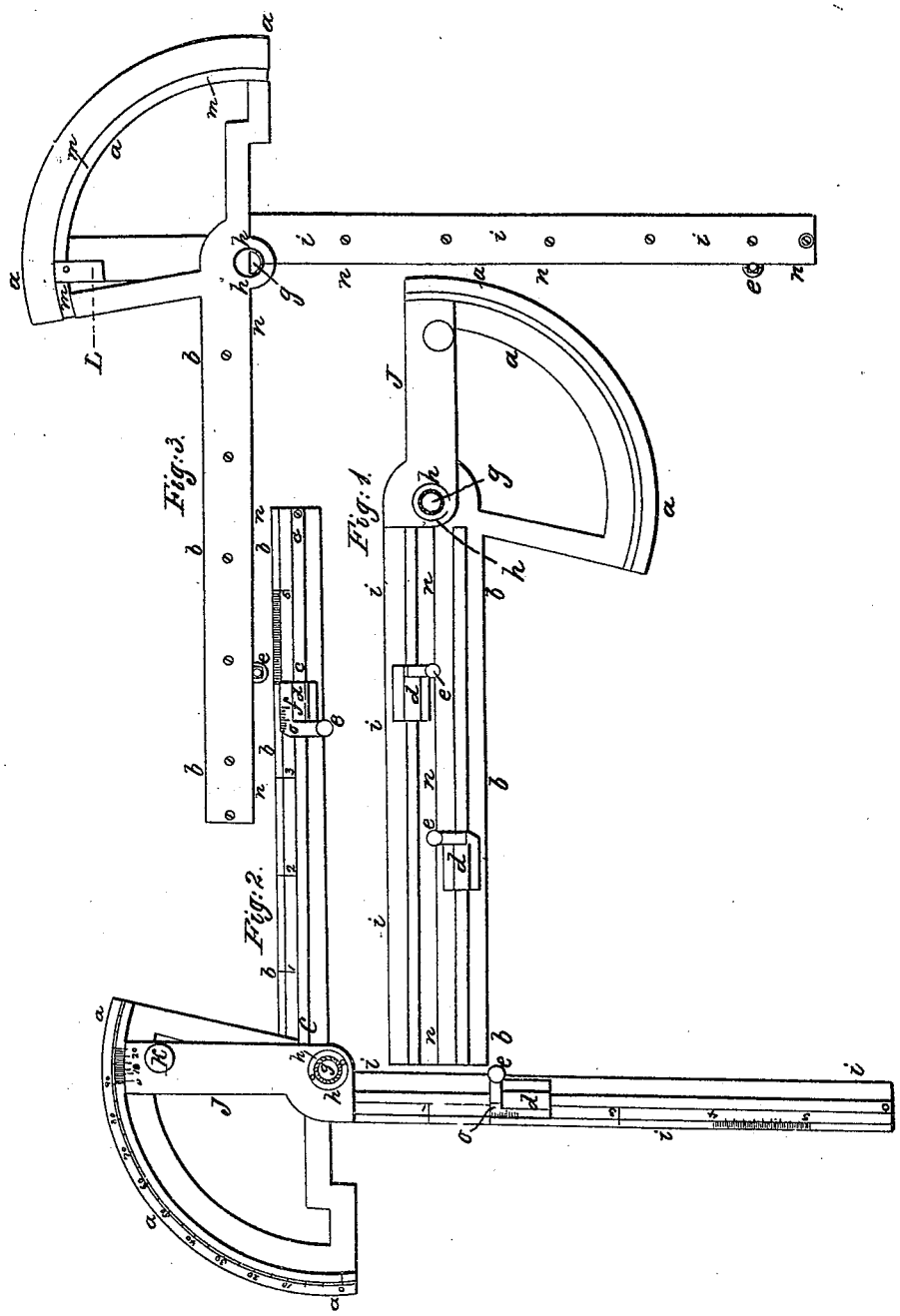

UNITED STATES PATENT OFFICE.

CHARLES R. ILIFF, OF FALMOUTH, KENTUCKY.

PLOTTING INSTRUMENT.

Specification of Letters Patent No. 19,091, dated January 12, 1858.

*To all whom it may concern:*

Be it known that I, CHARLES R. ILIFF, of Falmouth, in the county of Pendleton and State of Kentucky, have invented and made certain new and useful Improvements in Instruments for the Surveying or Plotting of Land; and I do hereby declare that the following is a full, clear, and exact description of the same, reference being had to the accompanying drawings, making a part of this specification, in which—

Figure 1, is the instrument complete, and closed up in compact form. Fig. 2, is a diagram of the instrument with its limbs extended, at right angles. Fig. 3, is the instrument inverted, or showing the opposite, face of it.

The nature of my improvements consist in constructing a plotting instrument, composed simply of two limbs, one of which has its short end formed with a quadrant, or arc of a circle, said arc being graduated or laid off in degrees and minutes and subdivided into equal parts as shown in Fig. 2. This quadrant limb, $a$, $a$, $a$, $b$, $b$, $b$, has the part $b$, $b$, $b$, laid off in divisions and subdivisions, or graduated with a scale of measure along its length, on the outside or right hand edge, which edge is beveled outwardly. Affixed to this limb, longitudinally, throughout its length, on its upper surface, in the center thereof, is a slip or strip of metal in form of a dovetail shape tongue, as at $c$, $c$, $c$, $c$. Fitted neatly and accurately thereto is a graduated sliding vernier $d$, which slides over this dovetail tongue-like slip. This vernier is provided with a small vertically arranged piston like pricker or point $e$, having a suitable head, beneath which head, and resting on the piston socket, is a delicate spiral spring, used to react the pricker point and maintain it in its vertical position. This sliding veriner has one of its bevel surfaces marked off with division lines, or a scale $f$ corresponding to the scale along the limb $b$, $b$, $b$. This quadrant limb, $b$, $b$, $b$ has a center or axis perforation or opening $g$ into which is fitted to work true, and smoothly, a bush $h$, $h$, to which is attached another or second limb, $i$, $i$, $i$, with a pointed or indicating extended limb or end J, the extremity of which is beveled and laid off in divisions as in Fig. 2. This end J, has a tightening or set screw $k$, to the under end of which is attached a heel piece L Fig. 3, fitting to and working smoothly on a rabbet $m$, $m$, $m$ formed on the underside or lower face of the quadrant as in Fig. 3. This heel piece serves as a clamp when the tightening screw $k$ is set and causes the end of the extended limb J, to be held in position at any required point of indication. This second limb $i$, $i$, $i$, is also provided with a central slip or dove tail like tongue, and vernier, similar to the quadrant limb, and is also laid off, or divided into a scale, as shown in Fig. 2.

In Fig. 3, the instrument is shown inverted, or upside down, presenting a perfectly true and flat surface, so as to be applied on a plane or regular surface. The point $g$, is the true center of the arc, and the edges $n$, $n$, $n$, Figs. 1, 3, of the limbs of the instrument start in direct radiating lines from said center, as do the lines marked off on the quadrant, or the arc, as the scale or division lines of indication.

Having described the construction of my instrument, the application of it is as follows, viz. When the instrument is used, the angle is taken on the arc, in degrees, or in degrees and minutes as the case may require. The distance is also marked off by sliding the vernier along the limbs to the point the angle or course of the line, may require; the pricker point being pressed down to indicate the beginning point, and this being done the center $g$, of the arc, $a$, $a$, $a$, is set at said point, which must be made in a meridian line, in order that the meridian limb may coincide with the same. The distance is then pricked or marked off by pressing down the pricker. The next parallel is then formed and the next course and distance taken as before and applied as above described, and so on until the work is complete. If it should be required to take the latitude and departure of any line, it is only necessary to place the limbs at right angles to each other, as in Fig. 2, and apply them to the line and the parallel, moving the point or punctures until they cut the two adjacent stations. Parallels are formed in the same manner. If it should be required to find the course of a closing line, it is only necessary to place the center of the arc on the last station and adjust one limb to a parallel and move the other until it will cut the first station and the course will appear on the arc, and the distances on the limb of the instrument. Thus the course of the closing lines and division lines may be accurately known with a facility heretofore unattainable by any instrument in use, and also giving readily the latitudes and departures.

So simple, compact, and portable an instrument for determining measurement and plotting of land it is believed has never before been produced, and the practical surveyor can most readily determine its great general utility, possessing as it does manifold features of adaptability, and dispensing almost entirely in its use with the various individual instruments and devices heretofore found requisite in plotting or surveying land. By a mere application of my instrument it becomes at once obvious the use of dividers, quadrant, rule and scale and square is entirely superseded, and thus dispensing entirely with repeated and tedious manipulation of appliances, besides rendering the operation of producing profile and other plots most simple and expeditious, and so very simple is the rule or mode of applying the instrument that the most inexperienced plotter becomes in a short time quite expert in the measurement of land.

Another very important feature of utility pertaining to my instrument is in its portability and very decided convenience in going from place to place being readily carried in one's side pocket and ready for use at all times. Again, too, in laying off townships and delineating sectional divisions of land my instrument will be found to be the most useful and facile in application of any other instrument in use, and when desired for use on a larger scale the limbs may be increased in proportion to width and length and the extent of the limbs may be made to be hinged together in lengths, as desired, thus admitting also of being folded up conveniently.

I am fully aware that quadrants, graduated scales and verniers have been used for various purposes, consequently I do not claim the invention of such devices. But What I do claim as new and useful and desire to have secured by Letters Patent of the United States is—

The construction of a portable pocket plotting instrument, embracing the graduated arc of a circle, a quadrant, the jointed graduated limbs, and the sliding scale verniers, substantially as described, and for the purposes set forth.

CHARLES R. ILIFF. [L. S.]

Witnesses:
C. DUNCAN,
RALPH TOMLINSON.